March 15, 1938.  V. E. CROSBY  2,111,044
COMBINATION TOILET SEAT AND COVER
Filed Oct. 7, 1936
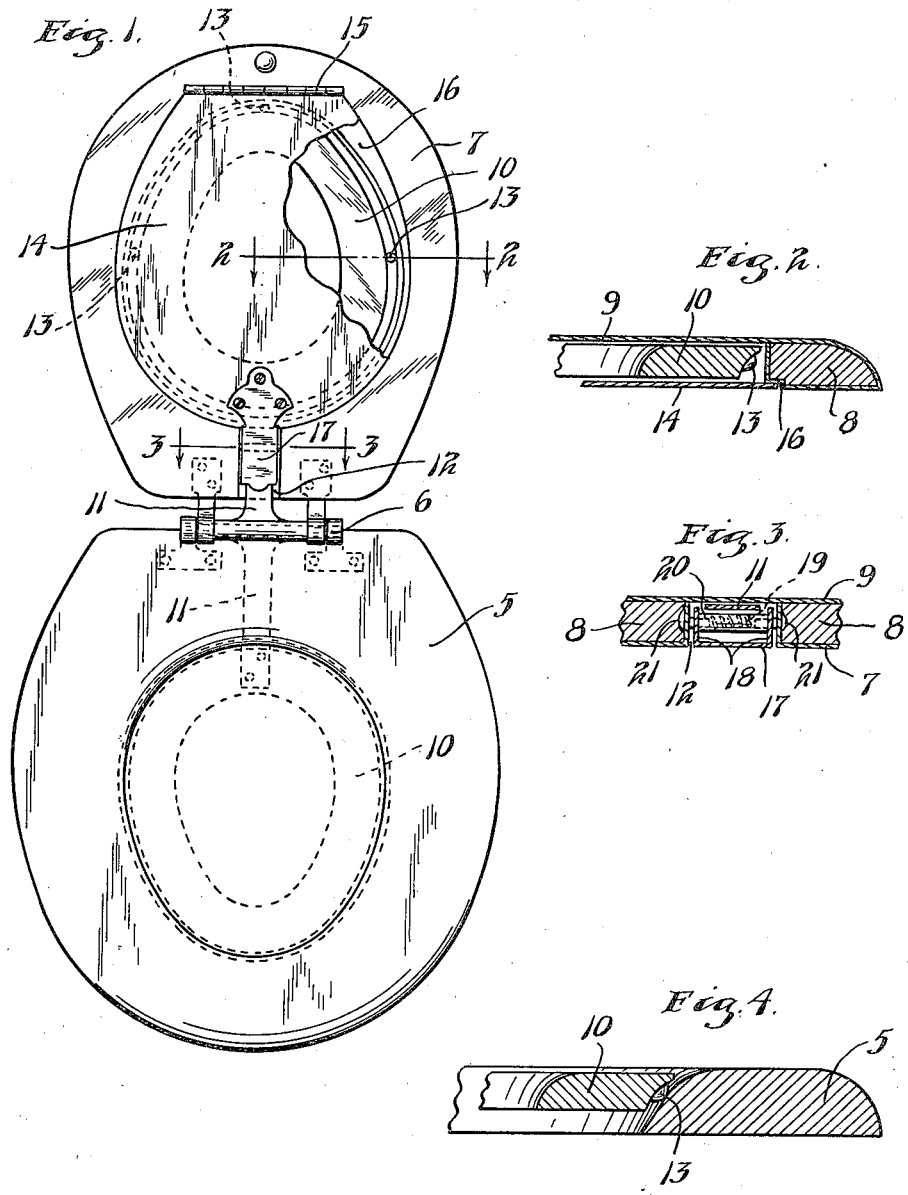
INVENTOR.
VERNON E. CROSBY.
BY HIS ATTORNEYS.
Williamson & Williamson Patented Mar. 15, 1938

2,111,044

UNITED STATES PATENT OFFICE 2,111,044

COMBINATION TOILET SEAT AND COVER

Vernon E. Crosby, Minneapolis, Minn.

Application October 7, 1936, Serial No. 104,410

6 Claims. (Cl. 4—234)

This invention relates to toilet seat covers and seats and more particularly to auxiliary seats for infants' use which are combined with seats and covers of conventional size.

It is one of the objects of my invention to provide such an auxiliary seat which may be swung into registration with and resting upon the larger seat and which also may be swung out of the way into a recess in the cover for said larger seat.

It is a further object of my invention to provide such an auxiliary seat which, when disposed in the recess in said cover, may be itself concealed by an auxiliary cover mounted on the larger cover in such a manner that the auxiliary cover, when in closed position, will lie flush with the under surface of said larger cover.

These and other objects and advantages of the invention will be fully set forth in the following description made in connection with the accompanying drawing, in which like reference characters refer to similar parts throughout the several views, and in which, Fig. 1 is a plan view showing the top of a larger seat with the larger cover hinged thereto and a portion of the auxiliary cover broken away to show the auxiliary seat thereunder;

Fig. 2 is a section taken on the line 2—2 of Fig. 1;

Fig. 3 is a section taken on the line 3—3 of Fig. 1; and

Fig. 4 is a transverse section showing the auxiliary seat resting upon the larger seat.

In the embodiment of the invention illustrated in the drawing, I provide a seat 5 of standard size and construction which is connected by means of a hinged member 6 to the main seat cover 7. The main cover is provided with a centrally positioned recess defined by the rounded substantially thick rim member 8 which may be closed on its upper side by the metal sheeting 9 which provides the inner wall of said recess.

An auxiliary seat member 10, of a size suitable for infants, is suitably secured by a relatively long strap hinge 11 to the hinge 6 which connects the main seat and cover. The auxiliary seat hinge 11 lies within the channel 12 formed in the lower portion of the under face of the main cover 7 and is of such length that when the auxiliary seat is swung upwardly said seat will lie within the recess in the main cover 7. This hinge is of a somewhat flexible metal to permit proper positioning of the auxiliary seat 10 within the opening in the main seat 5. Suitable rubber contact knobs 13 are conveniently positioned around the outer concave edge of the auxiliary seat 10 and are adapted to engage the convex inner rim of the main seat 11 to prevent either of the seats from becoming scratched or otherwise marred when the auxiliary seat is placed upon the main seat.

The auxiliary cover 14 is secured at its top edge by a hinge 15 which is counter-sunk in the face of the main cover 7. The auxiliary cover 14 rests in a counter-sunk portion 16 in the main cover 7, as best shown in Fig. 2, and is, therefore, capable of lying flush with the under surface of said main cover. A spring catch or retainer for the auxiliary cover is shown at 17 attached to the lower end of said auxiliary cover. This catch is in the form of a metallic plate flat at its upper end and adapted to receive screws or similar fastening means to secure the plate to the auxiliary cover and whose bottom portion is channel-shaped in cross section to provide side flanges 18 which support rounded pins or ball elements, whichever are desired, and which are urged outwardly away from each other by a spring member 19 positioned within the sleeve 20 which is supported by the side flanges 18. The spring-pressed pins or balls are adapted to slip into socket-like depressions 21 formed in the side walls of the channel 12 in the cover 7. With this construction the auxiliary seat supporting hinge 11 lies flat within the channel 12 and when the auxiliary cover 14 is closed, the catch member 17 will snap into place over said hinge 11 and the upper surface of the catch 17 will lie flush with the under surface of the main cover 7.

From the foregoing description, it will be seen that I have provided an auxiliary seat and cover for infant use which may be folded away into a recess in the main cover and which may be concealed from view by an auxiliary cover member whose hinge and fastening catch, as well as the auxiliary cover itself, lie flush with the under surface of said main cover. For that reason, the auxiliary seat, when not in use, is concealed from view and the auxiliary cover is so constructed and positioned that it and the auxiliary seat will hardly be noticed. My invention is simple in construction and inexpensive to manufacture and it would only be necessary to substitute my improved main cover with the auxiliary cover and seat secured thereto for a cover of conventional design.

It will, of course, be understood that various changes may be made in the form, details, proportions and arrangement of the parts without departing from the scope of my invention, which, generally stated, consists in a device capable of carrying out the objects above set forth and in the novel parts and combinations of parts set forth in the claims.

What is claimed is:—

1. In a device of the class described, a seat, a cover for said seat having a recess in its under side, an auxiliary seat adapted to fit within said recess, and an auxiliary cover adapted to conceal said auxiliary seat and lying flush with said first mentioned cover.

2. In a device of the class described, a seat, a cover for said seat having a recess in its under side and a countersunk portion around said recess, an auxiliary seat adapted to fit within said recess, and an auxiliary cover for said auxiliary seat adapted to be within said countersunk portion and lie flush with said first mentioned seat.

3. In a device of the class described, a seat, a cover for said seat having a recess in its under side, and a countersunk portion around said recess, a hinge connecting said seat and cover, an auxiliary seat connected to said hinge and adapted to fit in said recess, an auxiliary cover for said auxiliary seat adapted to lie within said countersunk portion, and fastening means for said auxiliary seat lying flush with said first mentioned cover.

4. In a device of the class described, a seat, a cover for said seat having a recess in its under side and a countersunk portion around said recess, a hinge connecting said seat and cover, an auxiliary seat connected to said hinge and adapted to lie on said first mentioned seat or in the recess in said cover, an auxiliary cover for said auxiliary seat adapted to lie in said countersunk portion, and a hinge connecting said covers and lying flush with the surfaces of said covers.

5. The structure defined in claim 2, and friction means retaining said auxiliary cover in closed position.

6. In a device of the class described, a seat, a cover for said seat having a recess in its under side and a countersunk portion around said recess, a hinge connecting said seat and cover, said hinge including a flexible strap mounted for swinging movement, an auxiliary seat connected to said strap and adapted to be totally received within said recess, and an auxiliary cover for said auxiliary seat adapted to be received within said countersunk portion.

VERNON E. CROSBY.